(12) United States Patent
Lin

(10) Patent No.: US 7,344,274 B2
(45) Date of Patent: Mar. 18, 2008

(54) LIGHT-MIXING MODULE HAVING MASK IN CORNER THEREOF

(75) Inventor: Jun-Hong Lin, Tainan County (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 132 days.

(21) Appl. No.: 11/453,813

(22) Filed: Jun. 16, 2006

(65) Prior Publication Data

US 2007/0291486 A1    Dec. 20, 2007

(51) Int. Cl.
*F21V 5/00*    (2006.01)

(52) U.S. Cl. .................... 362/248; 349/68; 349/69; 362/97; 362/231; 362/800

(58) Field of Classification Search .............. 349/61, 349/68, 69; 362/97, 231, 240, 248, 252, 362/613, 612, 800
See application file for complete search history.

(56) References Cited

U.S. PATENT DOCUMENTS 6,791,636 B2    9/2004   Paolini et al.
6,883,933 B2 *  4/2005   Matsui et al. ............... 362/231
7,281,816 B2 * 10/2007   Suzuki ........................ 362/231

\* cited by examiner

*Primary Examiner*—Stephen F Husar
(74) *Attorney, Agent, or Firm*—Bacon & Thomas, PLLC

(57) ABSTRACT

A light-mixing module includes a luminous panel having a plurality of red, green, and blue illuminants arranged alternately, at least one corner being formed in an area defined by the arrangement of the illuminants, a predetermined illuminant being located at the corner; at least one mask located above the luminous panel and over the corner for attenuating the light emitted therethrough from the predetermined illuminant thereunder and having a transmittance preferably lower than 90%; and a light-mixing panel located above the luminous panel and the mask. The light emitted from the illuminants passes through the light-mixing panel for mixture to generate required colored light and then to emit outward. Accordingly, the mask prevents the predetermined illuminant from displaying a weighted color, thus attaining the potency of even light mixture.

9 Claims, 4 Drawing Sheets

LIGHT-MIXING MODULE HAVING MASK IN CORNER THEREOF

BACKGROUND OF THE INVENTION

1. Field of the Invention

The present invention relates generally to backlight panels of panel displays, and more particularly, to a light-mixing module having a mask in corner thereof for improvement of uneven light mixture in the corners.

2. Description of the Related Art

As disclosed in the prior art, such as U.S. Pat. No. 6,791,636, a conventional backlight panel or module is composed of a plurality of illuminants having RGB (red, green, blue) colors and arranged in array on a panel. The illuminants are arranged evenly and their RGB colors are mixed by a light-mixing panel to output a white light source. However, such conventional backlight panel or module is defective because the illuminants of the same color are arranged in a row and rows of illuminants of different colors are arranged alternately, which output enables the user to be implicitly aware of colored light straps, thus incurring uneven light mixture.

A further improvement was made to the above-mentioned prior art, disclosing that the RGB illuminants, each row of which is not in the same color, are alternately arranged on the panel to effect more even light mixture.

Although the aforementioned prior art each employs the arrayal of the RGB illuminants to effect the light mixture, the illuminants located in each corner are surrounded by some illuminants of different colors arranged in a sector of 45 degree, thus failing to be completely mixed with others of different colors to enable any of the corners of the backlight panel to display a weighted color.

SUMMARY OF THE INVENTION

The primary objective of the present invention is to provide a light-mixing module having a mask in a corner thereof which light mixture is preferably even to avoid weighted color.

The foregoing objective of the present invention is attained by the light-mixing module composed of a luminous panel, at least one mask, and a light-mixing panel. The luminous panel includes a plurality of red, green, and blue illuminants arranged alternately. At least one corner is formed in an area defined by the arrangement of the illuminants, having a predetermined illuminant located thereat. The at least one mask is located above the luminous panel and over the corner for attenuating the light emitted therethrough from the predetermined illuminant thereunder, having a transmittance preferably lower than 90%. The light-mixing panel is located above the luminous panel and the mask. The light emitted from the illuminants passes through the light-mixing panel for mixture to generate required colored light and then to emit outward. Accordingly, the light emitted from the predetermined illuminant located at the at least one corner passes through the mask to be attenuated to enable the light mixed by the light-mixing panel to prevent the illuminant from displaying a weighted color, thus attaining the potency of even light mixture.

DETAILED DESCRIPTION OF PREFERRED EMBODIMENTS

Figure 1:
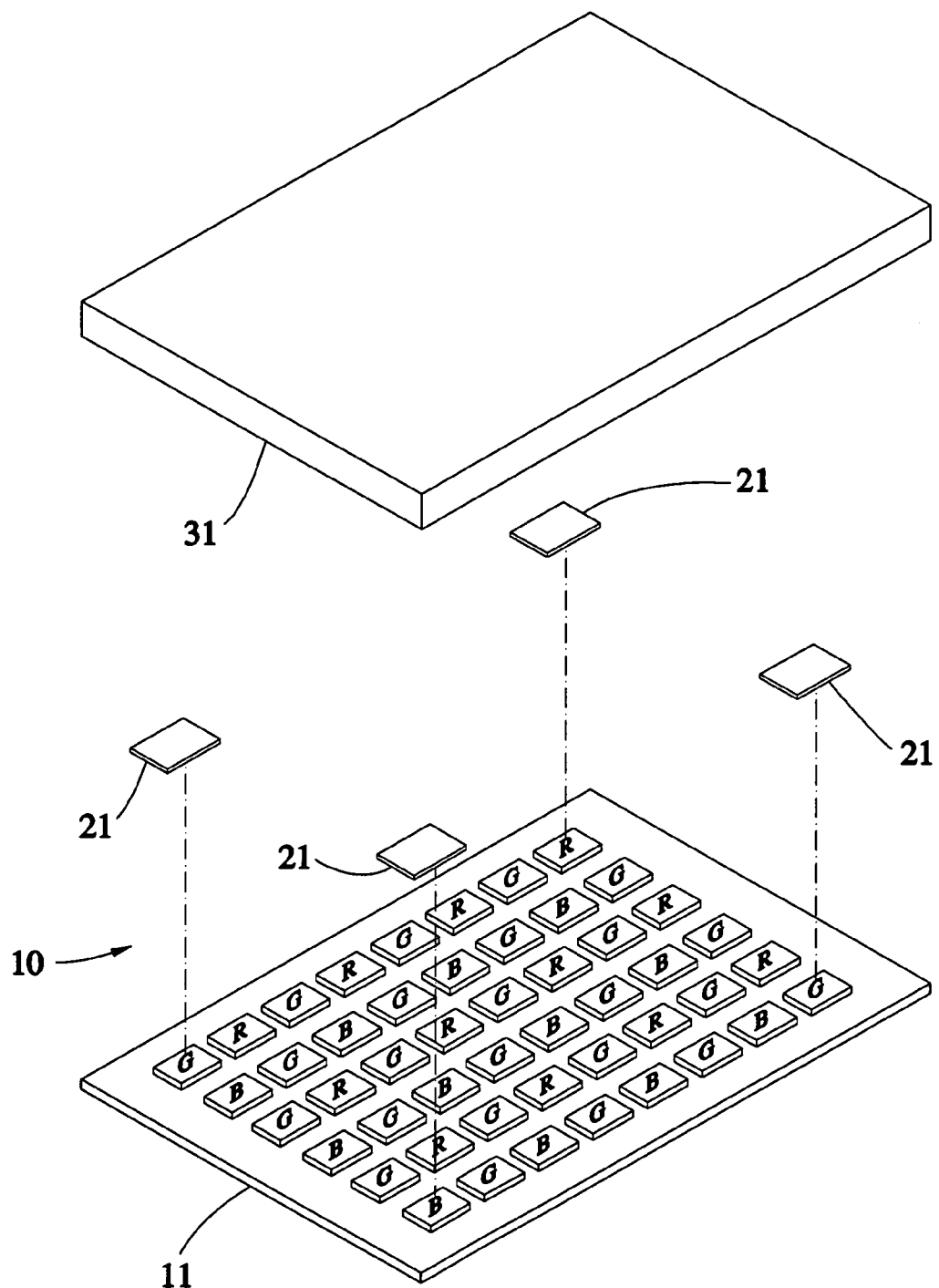
FIG. 1 is a perspective exploded view of a preferred embodiment of the present invention.
Figure 2:
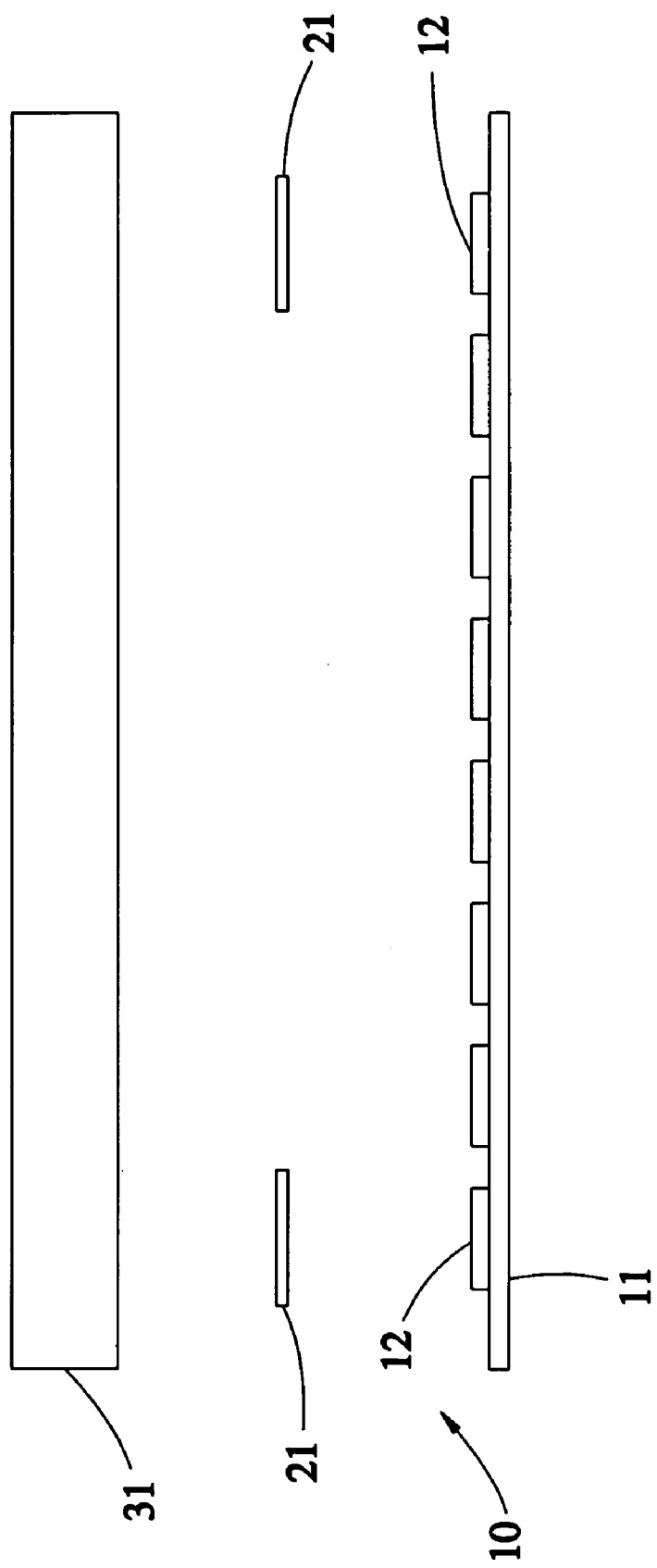
FIG. 2 is a side exploded view of the preferred embodiment of the present invention.
Figure 3:
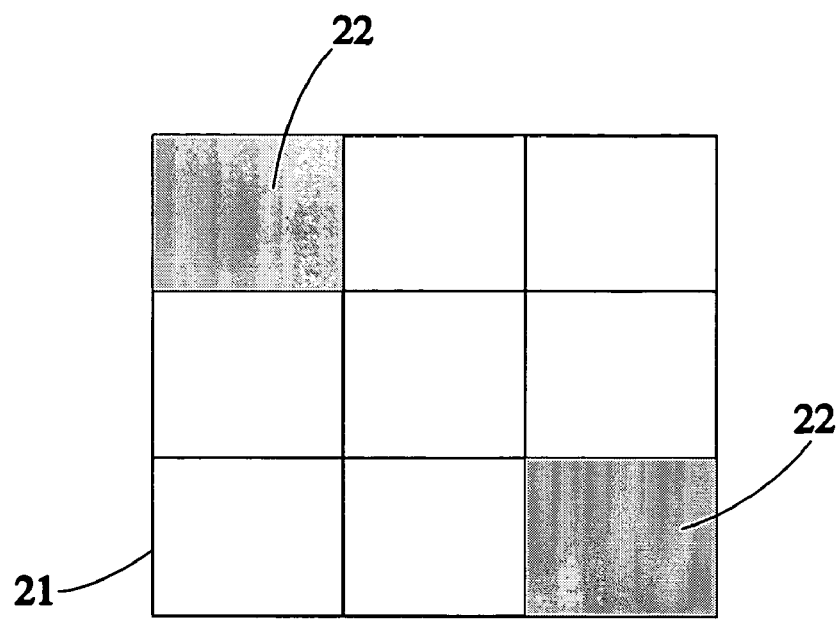
FIG. 3 is a schematic view of a part of the preferred embodiment of the present invention, illustrating the mask.

Referring to FIGS. 1-3, a light-mixing module 10 having a mask in a corner, constructed according to a preferred embodiment of the present invention, is composed of a luminous panel 11, four masks 21, and a light-mixing panel 31.

The luminous panel 11 includes a plurality of red, green, blue illuminants 12. The illuminants 12, which are defined as red light-emitting displays (LED), green LEDs, and blue LEDs respectively in this embodiment, are arranged in a rectangle having four corners. One of the illuminants 12, having a predetermined color, is located at each of the four corners of the rectangle.

The masks 21 are located above the luminous panel 11 and over the illuminants 12 located at the four corners respectively for attenuating the light emitted therethrough from the illuminants 12 thereunder, wherein the transmittance of the mask 21 is preferably lower than 90%. Each of the masks 21 is defined as transparent panel in this embodiment, having a plurality of opaque portions 22 disposed apart thereon.

The light-mixing panel 31 is located above the luminous panel 11 and the masks 21. The light emitted from the illuminants 12 passes through the light-mixing panel 31 for mixture to generate required colored light and then to emit outward.

In light of above, the present invention employs the masks 21 to attenuate the light emitted from the illuminants 12 located under the masks 21 while the light passes through the masks 21 and then the light enters the light-mixing panel 31 after attenuation, such that none of the light of weighted color displays at the corners. In other words, the present invention improves the drawbacks of weighted colored light at the corners and uneven light mixture for the prior art.

Figure 4:
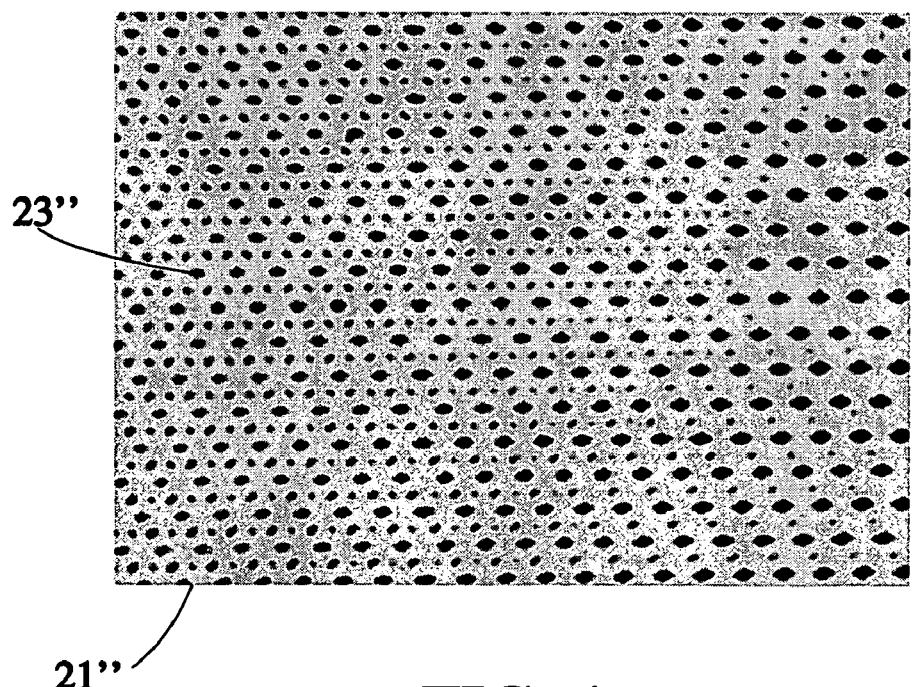
FIG. 4 is similar to FIG. 3, showing an alternative mask.
Figure 5:
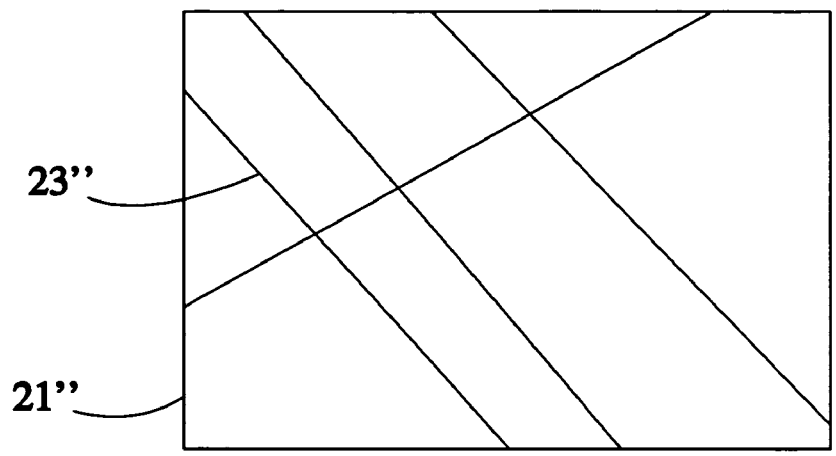
FIG. 5 is similar to FIG. 3, showing another alternative mask.
Figure 6:
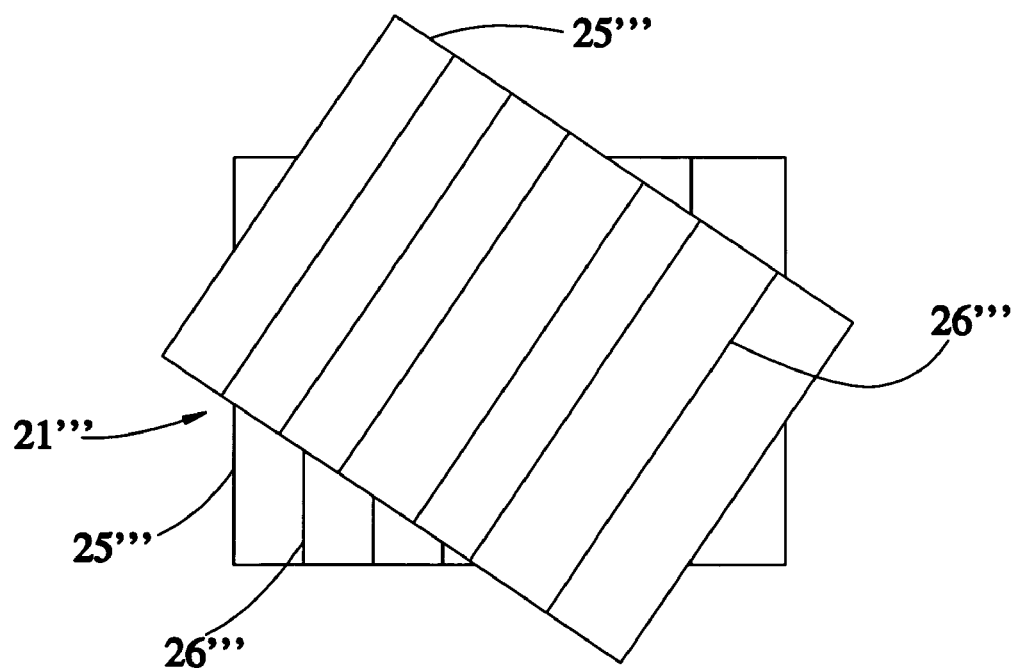
FIG. 6 is similar to FIG. 3, showing another alternative mask.

The mask 21 has a transmittance preferably smaller than 90%, not limited to the aforementioned format. As shown in FIG. 4, the mask 21' can alternatively include a refractive interfering marking 23' for refraction of a part of the light, and thus, the other part of the light passing through the masks 21 is attenuated to a certain degree. As shown in FIG. 5, the mask 21" can alternatively include a plurality of refractive stripes 24" parallel or crosswise formed thereon for refraction of a part of the light, and thus, the other part of the light passing through the masks 21 is attenuated as well. As shown in FIG. 6, the mask 21''' can alternatively be composed of two refractive panels 25''' superposed on each other Each of the refractive panels 25''' is disposed with a plurality of parallel refractive stripes 26'''. One of the refractive panels 25''' is rotatable to enable its refractive stripes 26''' and those of the other refractive panel 25''' to generate interference incurred at different angles and to further adjust the overall transmittance of the two refractive panels 25''', wherein the light can be also attenuated to pass through the refractive panels 25'''.

Although the mask of the present invention has been described with respect to a specific preferred embodiment thereof, it is no way limited to the details of the illustrated structures but changes and modifications may be made within the scope of the appended claims.

In conclusion, the present invention includes the following advantages. The masks enable the light emitted from the illuminants located at the corners to be attenuated to further cause preferably even light mixture at the corners. Further, the light-mixing module is located at the corners to avoid the light of weighted color.

What is claimed is:

1. A light-mixing module comprising:
   a luminous panel having a plurality of red, green, and blue illuminants arranged alternately thereon, said illuminants defining an area, within which at least one corner is provided, at least one predetermined illuminant being located at said corner;
   at least one mask located above said luminous panel and over said corner for attenuating the light emitted therethrough from said at least one predetermined illuminant located under said at least one mask; and
   a light-mixing panel located above said luminous panel and said mask, the light emitted from said illuminants passing through said light-mixing panel for mixture to generate required colored light and then to emit outward.

2. The light-mixing module as defined in claim 1, wherein said mask comprises a transmittance smaller than 90%.

3. The light-mixing module as defined in claim 1, wherein said illuminants are arranged in a rectangle.

4. The light-mixing module as defined in claim 3, wherein said at least one mask is four in number, said four masks being located over four corners of said rectangle of said illuminants.

5. The light-mixing module as defined in claim 1, wherein said mask further comprises at least one opaque portion.

6. The light-mixing module as defined in claim 5, wherein said mask further comprises a plurality of opaque portions disposed apart thereon.

7. The light-mixing module as defined in claim 1, wherein said mask further comprises a refractive interfering marking for refraction of a part of the light emitted from said illuminants.

8. The light-mixing module as defined in claim 1, wherein said mask further comprises a plurality of refractive stripes disposed parallel or crosswise thereon for refraction of a part of the light emitted from said illuminants.

9. The light-mixing module as defined in claim 1, wherein said mask is composed of two refractive panels superposed on each other, each of which is disposed with a plurality of parallel refractive stripes thereon, one of said refractive panels being rotatable to enable its refractive stripes and those of the other refractive panel to generate interference incurred at different angles and to further adjust overall transmittance of said two refractive panels.

* * * * *